(12) United States Patent
Yang

(10) Patent No.: US 6,611,589 B1
(45) Date of Patent: Aug. 26, 2003

(54) PBX SYSTEM FOR INTERWORKING DIGITAL TELEPHONE WITH PERSONAL COMPUTER AND CONTROLLING METHOD THEREOF

(75) Inventor: Kyeong-Ho Yang, Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/464,408

(22) Filed: Dec. 16, 1999

(30) Foreign Application Priority Data

Dec. 24, 1998 (KR) .......................... 1998-58352

(51) Int. Cl.[7] .............................................. H04M 7/00
(52) U.S. Cl. ............................... 379/221.15; 379/221.01
(58) Field of Search ................... 379/220.01, 221.01, 379/221.15, 225, 243, 352

(56) References Cited

U.S. PATENT DOCUMENTS

| | | |
|---|---|---|
| 5,065,425 A | 11/1991 | Lecomte et al. ......... 379/93.05 |
| RE35,050 E | 10/1995 | Gibbs et al. ............. 379/93.05 |
| 5,799,068 A | 8/1998 | Kikinis et al. ........... 379/93.06 |
| 5,875,234 A | 2/1999 | Clayton et al. .......... 379/93.05 |
| 6,091,808 A * | 7/2000 | Wood et al. ................. 370/352 |
| 6,175,564 B1 * | 1/2001 | Miloslavsky et al. ....... 370/270 |

* cited by examiner

Primary Examiner—Ahmad F. Matar
Assistant Examiner—Quynh Nguyen
(74) Attorney, Agent, or Firm—Robert E. Bushnell, Esq.

(57) ABSTRACT

There is provided a private branch exchange (PBX) system for interworking a digital telephone with a computer such as a personal computer (PC). In the private branch exchange system, a switch has a subscriber interface, a computer telephony interface module (CTIM) is connected to the subscriber interface of the switch, the digital telephone is connected to the switch through the computer telephony interface module, and the computer is connected to the switch through the computer telephony interface module and interworks with the digital telephone. The computer telephony interface module sends a computer-directed message generated from the switch to the computer and sends both the switch and the computer a call origination event message received from the digital telephone.

26 Claims, 5 Drawing Sheets

PBX SYSTEM FOR INTERWORKING DIGITAL TELEPHONE WITH PERSONAL COMPUTER AND CONTROLLING METHOD THEREOF

CLAIM OF PRIORITY

This application makes reference to, incorporates the same herein, and claims all benefits accruing under 35 U.S.C. §119 from an application entitled PBX System for Interworking Digital Telephone With Personal Computer And Controlling Method Thereof earlier filed in the Korean Industrial Property Office on Dec. 24, 1998 and there duly assigned Ser. No. 58352/1998, a copy of which is annexed hereto.

BACKGROUND OF THE INVENTION

1. Technical Field

The present invention relates to a private branch exchange (PBX) system, and more particularly to a private branch exchange system for enabling a digital telephone to work with a computer in an integrated manner, and a controlling method therefore.

2. Related Art

A private branch exchange system can be provided on the premises of a public office, hospital, or company to make a connection between a central office (CO) line and extension subscriber or between extension subscribers. A private exchange system refers to a small exchange for switching a plurality of extension terminals within the same building or the same office, including a key phone system, a private branch exchange, and a private branch automatic exchange (PBAX).

I have found that there is a need for an improved method of integrating a computer system with a digital telephone in conjunction with a private branch exchange to enable them to work together in an integrated manner. Computer systems are information handling systems that are utilized by many individuals and businesses today. A computer system can be defined as a microcomputer that includes a central processing unit (CPU), a volatile memory, a non-volatile memory such as read only memory (ROM), a display monitor, a keyboard, a mouse or other input device such as a trackball, a floppy diskette drive, a compact disc-read only memory (CD-ROM) drive, a modem, a hard disk storage device, and a printer. A computer system's main board, which is a printed circuit board known as a motherboard, is used to electrically connect these components together. A computer system can be a desktop computer, a personal computer, a portable computer such as a notebook computer or palm-sized computer, or other type of computer.

Efforts have been made to improve connections between computers and telephone-related systems. Exemplars of recent efforts in the art include U.S. Pat. No. 5,875,234 for Computer Integrated PBX System, issued to Clayton et al.; U.S. Pat. No. 5,799,068 for Smart Phone Integration with Computer Systems, issued to Kikinis et al.; U.S. Pat. No. 5,065,425 for Telephone Connection Arrangement for a Personal Computer and a Device for Such an Arrangement, issued to Lecomte et al.; and U.S. Pat. No. Re. 35,050 for Personal Computer-As an Interface Between a Telephone Station Set and a Business Communication System, issued to Gibbs et al.

While these recent efforts provide advantages, I note that they fail to adequately provide a private branch exchange system for efficiently and conveniently enabling a digital telephone to work with a computer in an integrated manner, and a method for controlling the private branch exchange system.

SUMMARY OF THE INVENTION

Therefore, an object of the present invention is to provide a private branch exchange system for enabling a digital telephone to work with a computer in an integrated manner.

A further object of the present invention is to provide a method of controlling a private branch exchange enabling a digital telephone to work with a computer, such as a personal computer (PC), in an integrated manner.

To achieve the above objects and others, there is provided a private branch exchange system for interworking a digital telephone with a computer. In other words, there is provided a private branch exchange system enabling a digital telephone to work with a computer in an integrated manner.

In the private branch exchange system, a switch has a subscriber interface, a computer telephony interface module is connected to the subscriber interface of the switch, the digital telephone is connected to the switch through the computer telephony interface module, and the computer is connected to the switch through the computer telephony interface module and interworks with the digital telephone. The computer telephony interface module sends a computer-directed message generated from the switch to the computer and sends both the switch and the computer a call origination event message received from the digital telephone.

To achieve these and other objects in accordance with the principles of the present invention, as embodied and broadly described, the present invention provides a communication apparatus, comprising: a switch having a connector; an interface unit being connected to said connector of said switch; at least one telephone unit being connected to said interface unit; and at least one computer unit being connected to said interface unit; said interface unit transmitting a first message generated from said switch to said at least one computer unit, said interface unit transmitting a second message received from said at least one telephone unit to said switch and said at least one computer unit, said first message corresponding to a computer-directed message, said second message corresponding to a call origination event.

To achieve these and other objects in accordance with the principles of the present invention, as embodied and broadly described, the present invention provides a communication apparatus, comprising: a private branch exchange system comprising: a switch having a connector; an interface unit being connected to said connector of said switch; at least one digital telephone unit being connected to said interface unit; and at least one computer unit being connected to said interface unit; said interface unit transmitting a first message generated from said switch to said at least one computer unit, said interface unit transmitting a second message received from said at least one telephone unit to said switch and said at least one computer unit, said interface unit transmitting a third message generated from said computer unit to said switch, said interface unit transmitting a fourth message generated from said switch to said at least one telephone unit and to said at least one computer unit, said first message corresponding to a computer-directed message, said second message corresponding to a call origination event, said third message corresponding to a call-related event, said fourth message corresponding to a response message in accordance with said call-related event.

To achieve these and other objects in accordance with the principles of the present invention, as embodied and broadly described, the present invention provides a method, comprising: interconnecting a digital telephone and a computer unit in a private branch exchange system having an interface unit connecting the digital telephone to the computer unit, said interconnecting further comprising: when an incoming call is terminated in said digital telephone, sending information about the incoming call to said computer unit; and when said computer unit originates a call, setting said digital telephone to a call origination state.

The present invention is more specifically described in the following paragraphs by reference to the drawings attached only by way of example. Other advantages and features will become apparent from the following description and from the claims.

BRIEF DESCRIPTION OF THE DRAWINGS

In the accompanying drawings, which are incorporated in and constitute a part of this specification, embodiments of the invention are illustrated, which, together with a general description of the invention given above, and the detailed description given below, serve to exemplify the principles of this invention.

DETAILED DESCRIPTION OF THE PREFERRED EMBODIMENT

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Figure 1:
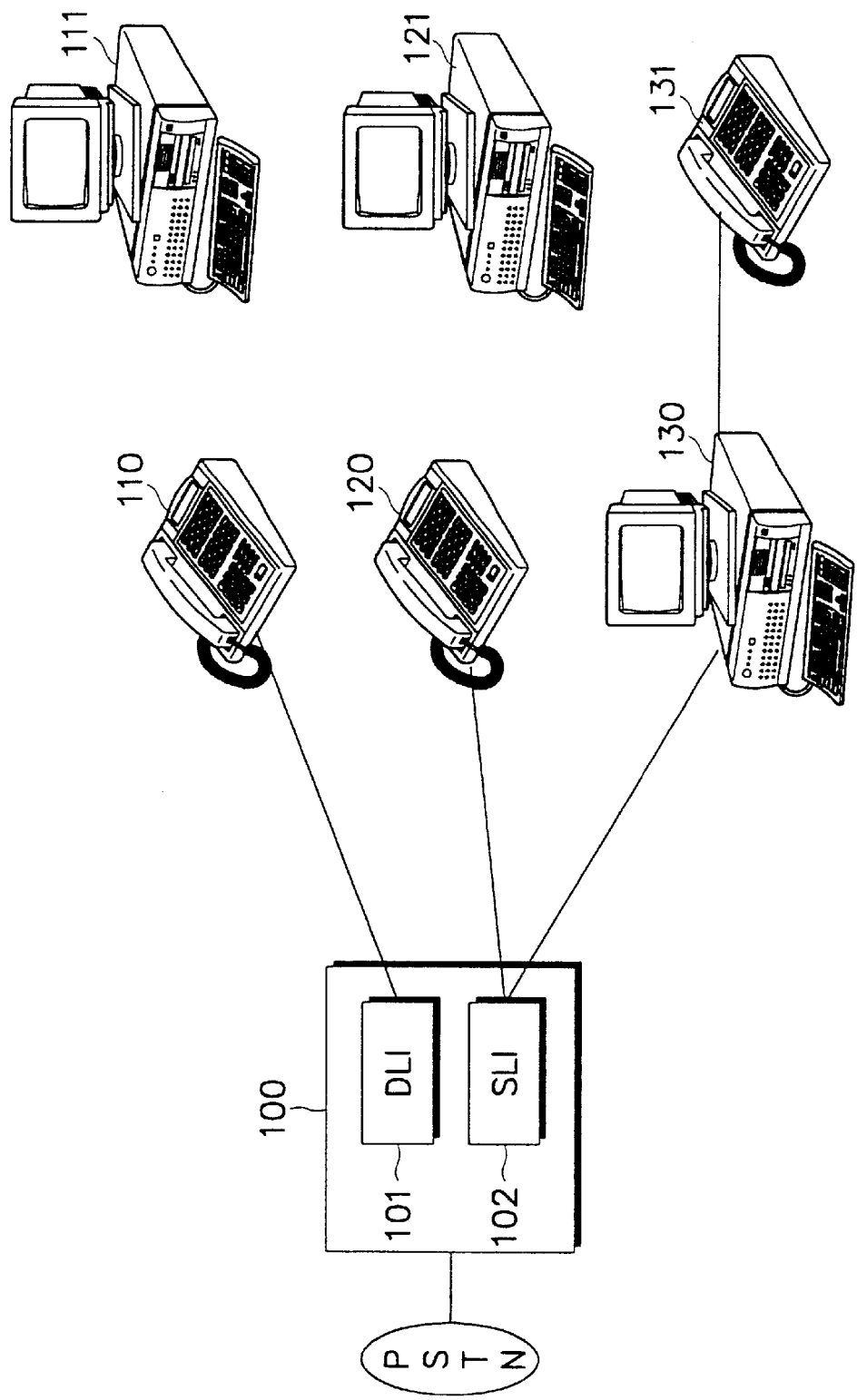
FIG. 1 illustrates a connection of subscriber terminals to a private branch exchange system.

Refer now to FIG. 1. In a private branch exchange system, a switch 100 is connected to a digital telephone 110 through a digital line interface (DLI) 101 in FIG. 1. The switch 100 is connected to a general telephone 120 through a single line interface (SLI) 102 and to another general telephone 131 through the single line interface 102 and a computer 130 having a modem. The computer 130 can be a personal computer (PC). Computers 111 and 121 may have an application program functioning as a telephone directory but cannot be used in conjunction with the digital telephone 110 or the analog telephone 120 without a modem. Computers 111 and 121 can be personal computers (PCs). The computer 130 with a modem can execute certain limited functions of the telephone such as call origination though it is connected to the analog telephone 131. Even the limited telephone functions can be provided in the computer as long as the modem is so configured as to process voice. FIG. 1 shows a public switched telephone network (PSTN) connected to the switch 100. A public switched telephone network is a collection of interconnected systems operated by the various telephone companies and administrations around the world.

Figure 2:
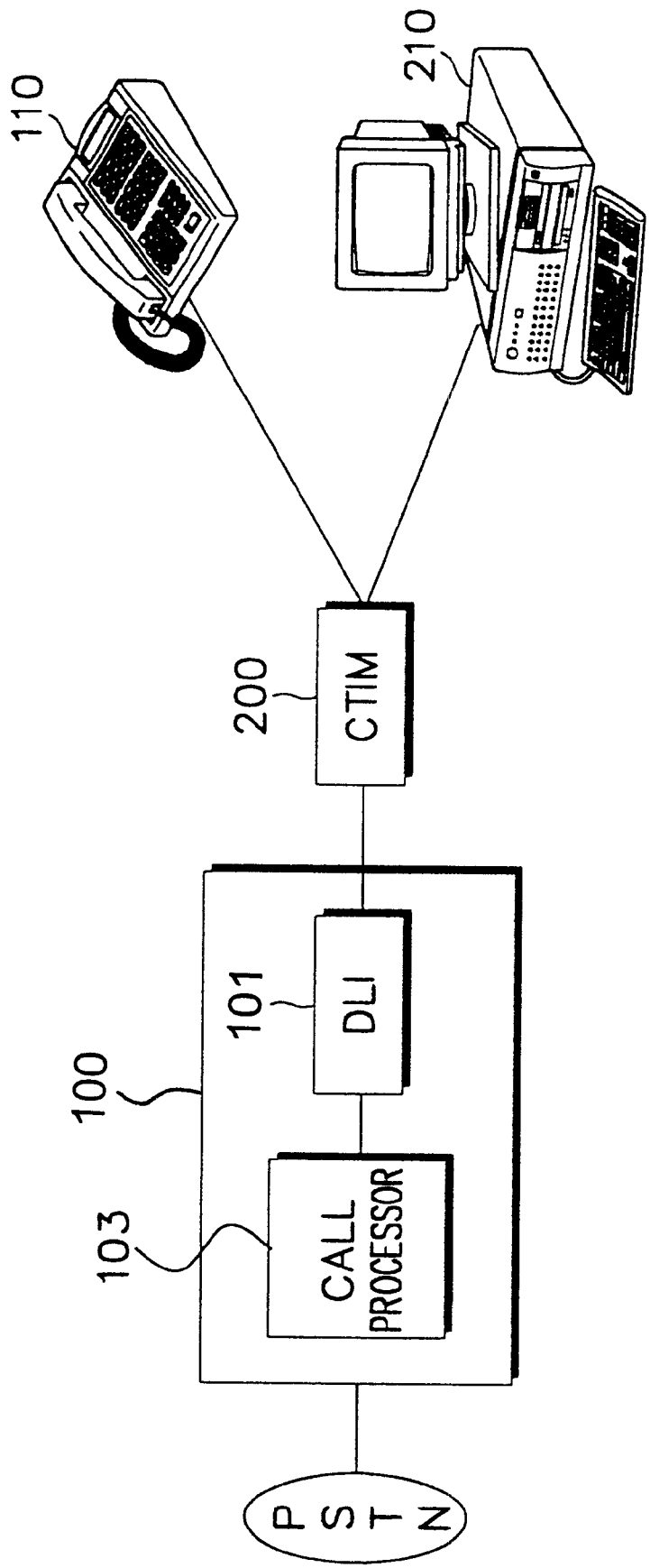
FIG. 2 is a schematic view of a private branch exchange system for interworking a digital telephone with a computer according to the present invention.

FIG. 2 is a block diagram of a private branch exchange system in which a digital telephone interworks with a computer according to the present invention. Referring to FIG. 2, the switch 100 is connected to the digital telephone 110 and a computer 210 through a computer telephony interface module (CTIM) 200. The computer 210 can be a personal computer (PC). FIG. 2 shows a public switched telephone network (PSTN) connected to the switch 100.

The computer telephony interface module 200 is connected to the digital line interface 101 of the switch 100 and includes a jack for connecting to the digital line interface 101, a jack for connecting to the digital telephone 110, and a port for connecting the computer 210. The computer telephony interface module 200 communicates with the switch 100 through the digital line interface 101, and is linked to the digital telephone 110 for telephony through B+D channels among 2B+D channels of a telephone line and to the computer 210 for data transmission through the other channel. The digital telephone 110 operates regardless of the status of the computer telephony interface module 200, and the computer 210 communicates with the computer telephony interface module 200 through a communication port. The communication port can be referred to as a comport. The computer 210 communicates events and commands associated with an incoming call and an outgoing call from the digital telephone 210 with the computer telephony interface module 200.

The computer telephony interface module 200 sends the computer 210 a message directed toward the computer 210 among messages sent to the digital telephone 110 from a call processor 103 of the switch 100. The computer telephony interface module 200 simultaneously sends an event message generated from the digital telephone 110 to the switch 100 and the computer 210. A call-related event generated from the computer 210 is directly transmitted to the call processor 103 through the computer telephony interface module 200, and a response message for the call-related event is sent both to the digital telephone 110 and the computer 210. In other words, the switch 100 considers the digital telephone 110 and the computer 210, which are connected to the computer telephony interface module 200, to be one object. Thus, the switch 100 synchronizes the digital telephone 110 with the computer 210 in terms of event processing, though they are spaced physically. If the digital telephone 110 originates a call, the computer 210 is also set to a call origination state, and vice versa. If a call is terminated in the digital telephone 110, the computer telephony interface module 200 sets the computer 210 to a call termination state.

Figure 3:
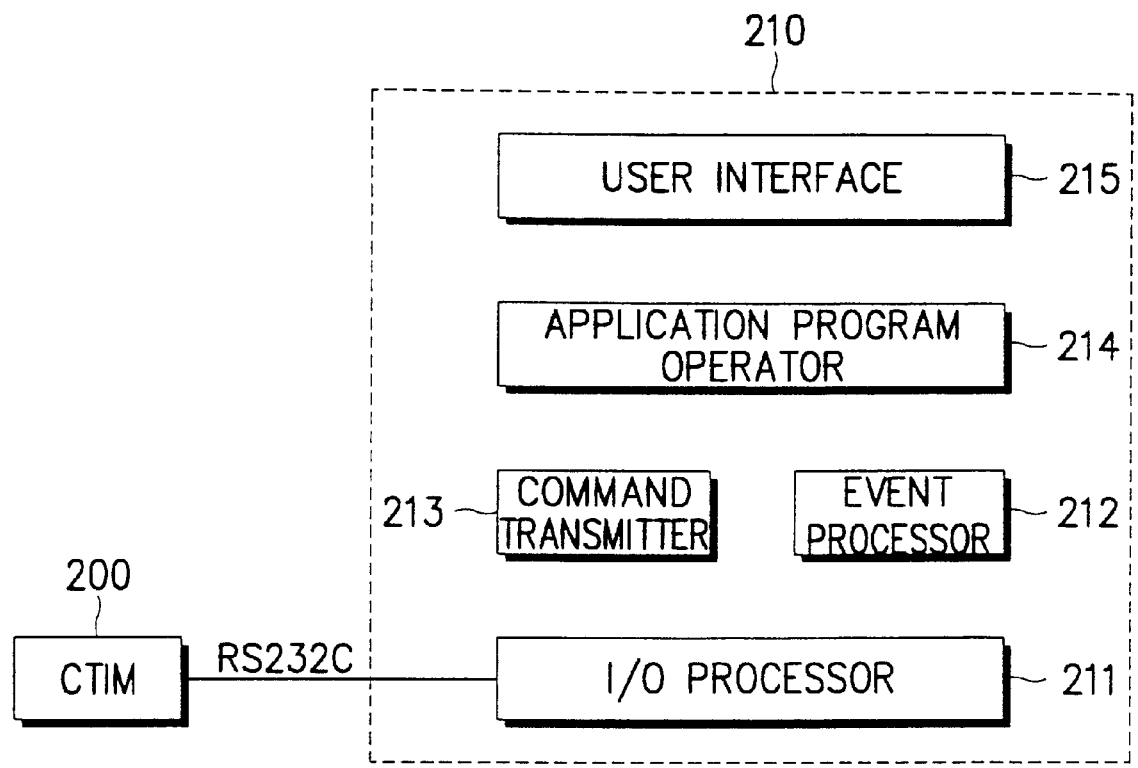
FIG. 3 is a block diagram of a computer interworking with a digital telephone in the private branch exchange system according to the present invention.

FIG. 3 is a block diagram of the computer interworking with the digital telephone according to the present invention. Referring to FIGS. 2 and 3, the computer 210 is connected to the computer telephony interface module 200 through an input/output processor (I/O processor) 211.

An event processor 212 processes an event generated during executing an application program by an application program operator 214 or an event received from the computer telephony interface module 200. The event processor 212 can control data related to the aforementioned events and can control the recording of data related to the aforementioned events. The application program operator 214 means a processor operating an application program for a telephone service in a computer.

A command transmitter 213 sends a user command received from a user interface 215 to the computer telephony interface module 200 through the input/output processor 211 while the application program operator 214 executes the application program. The command transmitter 213 also sends a command received from the computer telephony interface module 200 to the application program operator 214. The application program operator 214 executes a telephony-relayed application program upon request from a user through the user interface 215 or from computer telephony interface module 200 through the input/output processor 211. The user interface 215 sends a user request to the application program operator 214 and notifies the user of the function implemented by the application program operator 214.

For example, the telephony-related application program can enable the computer 210 to initiate and receive telephone calls for voice communication purposes, to initiate and receive telephone calls for fax communication purposes, to record a length of telephone calls, a time and date of telephone calls, a number identifying an origination telephone, a number identifying a destination telephone, a cost of telephone calls, a name of a calling party, a name of a called party, as well as additional information.

Figure 4A:
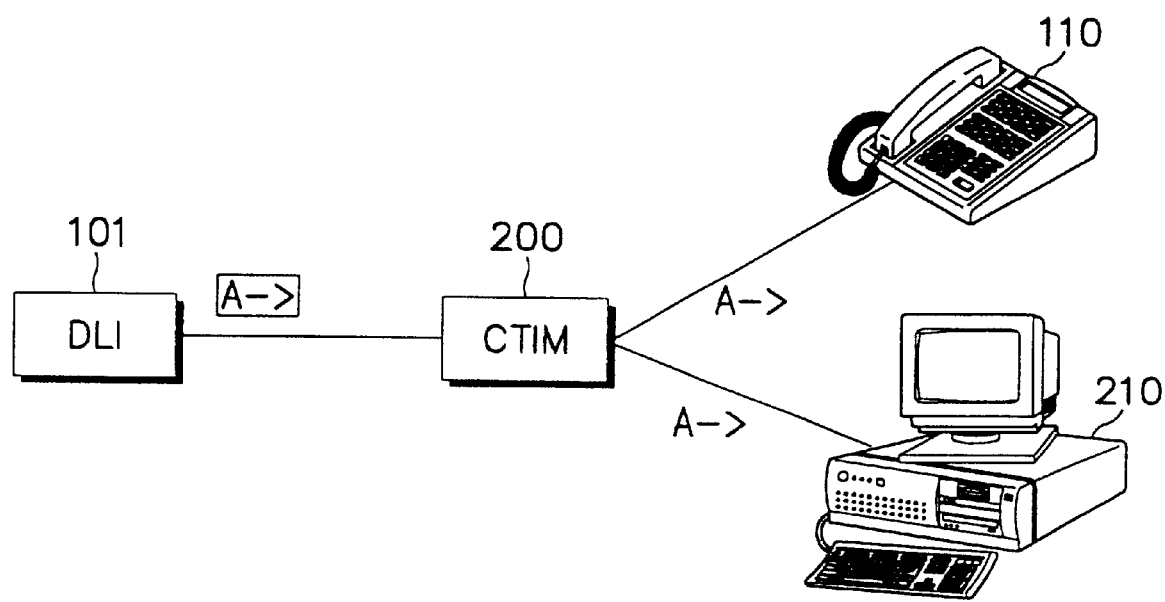
FIGS. 4A and 4B illustrate the flow of messages between the digital telephone and the computer which interwork in the private branch exchange system according to the present invention.
Figure 4B:
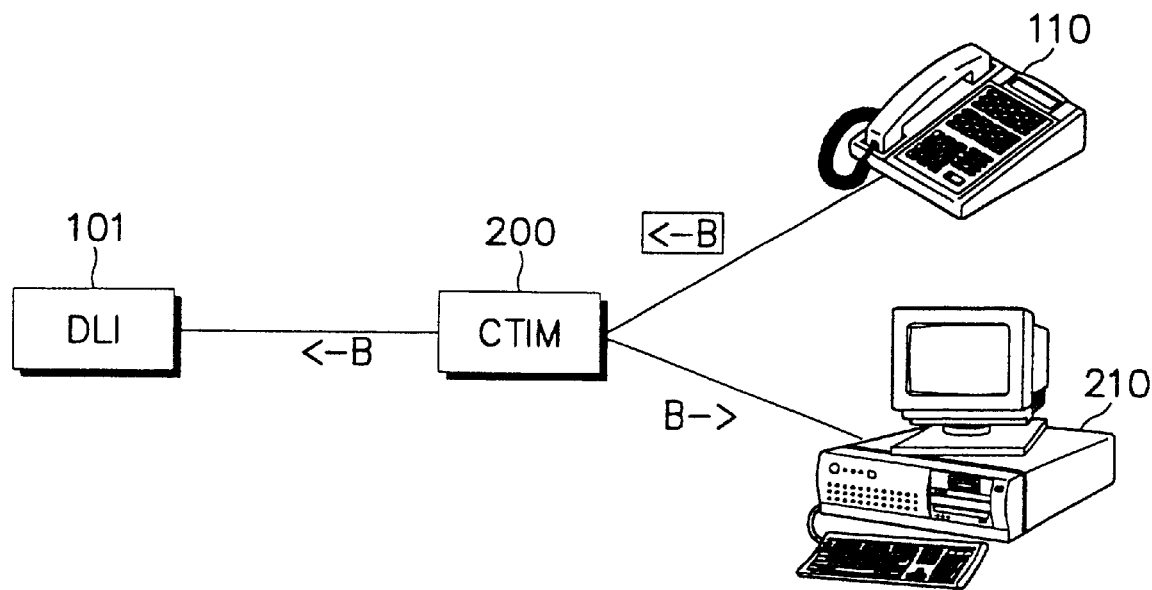

FIG. 4A illustrates a message flows from the switch to the interworking digital telephone and computer in the private branch exchange system according to the present invention, and FIG. 4B illustrates a message flow from the digital telephone to the switch and the computer in the private branch exchange system.

Referring to FIGS. 2 to 4B, there will be a description of the operation of the private branch exchange system in which the digital telephone interworks with the computer according to the present invention. In order to interwork the digital telephone with the computer, messages similar to those exchanged between the call processor 103 of the switch 100 and the digital telephone 110 are defined between the call processor 103 and the input/output processor 211 of the computer 210. The messages include an event message generated during call processing and a command message for executing a function. The range of functions provided to the computer 210 by the switch 100 depends on the message definition. The computer 210 can dial a stored telephone number to originate a call by a telephony-related application program, and receive information about a calling subscriber from the switch 100 for monitoring when a call is terminated. In addition, the computer 210 can provide various call-related services such as recording information about all incoming and outgoing calls. The telephony-related application means an application program for telephone services, namely sending/transmitting a call, showing the state of call reception/transmission, and more. A call is terminated when a calling signal is received or transmitted in a digital telephone.

In accordance with the present invention as described above, the computer can provide functions of a telephone and services including call origination from a telephone directory, calling subscriber information monitoring, and call information recording by use of information processing and storing functions unique to the computer. Furthermore, the present invention is advantageous in that a user can access a switching function more conveniently in a computer environment than from a telephone, and various pieces of customer information stored in the computer can be used in conjunction with a telephone.

The foregoing paragraphs describe the details of a private branch exchange (PBX) system, and more particularly to a private branch exchange system for interworking a digital telephone with a personal computer (PC) and a controlling method thereof.

While the present invention has been illustrated by the description of embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departing from the spirit or scope of the applicant's general inventive concept.

What is claimed is:

1. A communication apparatus, comprising:
   a switch having a connector;
   an interface unit being connected to said connector of said switch;
   at least one telephone unit being connected to said interface unit; and
   at least one computer unit being connected to said interface unit;
   said interface unit transmitting a first message generated from said switch to said at least one computer unit, said interface unit transmitting a second message received from said at least one telephone unit to said switch and said at least one computer unit, said first message corresponding to a computer-directed message, said second message corresponding to a call origination event.

2. The apparatus of claim 1, further comprising said interface unit transmitting a third message generated from said computer unit to said switch, said interface unit transmitting a fourth message generated from said switch to said at least one telephone unit and to said at least one computer unit, said third message corresponding to a call-related event, said fourth message corresponding to a response message in accordance with said call-related event.

3. The apparatus of claim 1, further comprising said apparatus corresponding to a private branch exchange system.

4. The apparatus of claim 1, further comprising said switch corresponding to a telecommunications switch coupling said interface unit with a public switched telephone network, said switch conveying voice and data signals between said at least one telephone unit and said public switched telephone network.

5. The apparatus of claim 1, further comprising said at least one telephone unit corresponding to a digital telephone.

6. The apparatus of claim 1, further comprising said at least one computer unit corresponding to a personal computer.

7. The apparatus of claim 1, further comprising a plurality of communication cables being connected to said interface unit, including a first communication cable.

8. The apparatus of claim 7, further comprising said first communication cable connecting said interface unit to said at least one telephone unit.

9. The apparatus of claim 8, further comprising said plurality of communication cables corresponding to a plurality of subscriber lines.

10. The apparatus of claim 1, said switch further comprising:
   a central processing unit generating said first message; and
   a digital line interface being coupled to said central processing unit and said interface unit.

11. The apparatus of claim 1, said computer unit further comprising:
   an input/output processor being connected to said interface unit to process signals transmitted from said computer unit and received to said computer unit;
   an event processor receiving and controlling said first and second messages received from said interface unit through said input/output processor, said event processor receiving and controlling additional messages;
   a command transmitter transmitting a command received from said input/output processor and additional commands;
   an application program operator executing an application routine, said application routine enabling said computer unit to record a time and date said first and second messages were received, said additional messages and said additional commands being generated by said application routine; and
   a user interface interfacing a user with said computer unit.

12. The apparatus of claim 2, said computer unit further comprising:
   an input/output processor being connected to said interface unit to process signals transmitted from said computer unit and received to said computer unit;
   an event processor receiving and controlling said first, second, and fourth messages received from said interface unit through said input/output processor, said event processor receiving and controlling additional messages;
   a command transmitter transmitting a command received from said input/output processor and additional commands;
   an application program operator executing an application routine, said application routine enabling said computer unit to record a time and date said first, second, and third messages were received, said additional messages and said additional commands being generated by said application routine; and
   a user interface interfacing a user with said computer unit.

13. A communication apparatus, comprising:
   a private branch exchange system comprising:
      a switch having a connector;
      an interface unit being connected to said connector of said switch;
      at least one digital telephone unit being connected to said interface unit; and
      at least one computer unit being connected to said interface unit;
      said interface unit transmitting a first message generated from said switch to said at least one computer unit, said interface unit transmitting a second message received from said at least one telephone unit to said switch and said at least one computer unit, said interface unit transmitting a third message generated from said computer unit to said switch, said interface unit transmitting a fourth message generated from said switch to said at least one telephone unit and to said at least one computer unit, said first message corresponding to a computer-directed message, said second message corresponding to a call origination event, said third message corresponding to a call-related event, said fourth message corresponding to a response message in accordance with said call-related event.

14. The apparatus of claim 13, further comprising said switch corresponding to a telecommunications switch coupling said interface unit with a public switched telephone network, said switch conveying voice and data signals between said at least one telephone unit and said public switched telephone network.

15. The apparatus of claim 14, further comprising a plurality of communication cables being connected to said interface unit, including a first communication cable.

16. The apparatus of claim 15, said switch further comprising:
   a central processing unit generating said first message; and
   a digital line interface being coupled to said central processing unit and said interface unit.

17. The apparatus of claim 16, said computer unit further comprising:
   an input/output processor being connected to said interface unit to process signals transmitted from said computer unit and received to said computer unit;
   an event processor receiving and controlling said first, second, and fourth messages received from said interface unit through said input/output processor, said event processor receiving and controlling additional messages;
   a command transmitter transmitting a command received from said input/output processor and additional commands;
   an application program operator executing an application routine, said application routine enabling said computer unit to record a time and date said first, second, and third messages were received, said additional messages and said additional commands being generated by said application routine; and
   a user interface interfacing a user with said computer unit.

18. A method, comprising:
   interconnecting a digital telephone and a computer unit in a private branch exchange system having an interface unit connecting the digital telephone to the computer unit, said interconnecting further comprising:
      when an incoming call is terminated in said digital telephone, sending information about the incoming call to said computer unit; and
      when said computer unit originates a call, setting said digital telephone to a call origination state.

19. The method of claim 18, further comprising said sending of the information and said terminating of the incoming call being performed simultaneously.

20. The method of claim 19, further comprising said computer unit receiving information about a calling subscriber for monitoring when a call is terminated, and storing information about all incoming and outgoing calls.

21. The apparatus of claim 2, said switch being in communication with a public switched telephone network, said switch separating said interface unit from the public switched telephone network, said interface unit being directly connected to said connector of said switch, said interface unit being directly connected to said at least one telephone unit, said interface unit being directly connected to said at least one computer unit, said interface unit separating said switch from said at least one telephone unit, said interface unit separating said switch from said at least one computer unit.

22. The apparatus of claim 13, said switch being in communication with a public switched telephone network, said switch separating said interface unit from the public switched telephone network, said interface unit being directly connected to said connector of said switch, said interface unit being directly connected to said at least one telephone unit, said interface unit being directly connected to said at least one computer unit, said interface unit separating said switch from said at least one digital telephone unit, said interface unit separating said switch from said at least one computer unit.

23. The method of claim 20, further comprising connecting a switch directly to the interface unit, the switch of the private branch exchange system being in communication with a public switched telephone network, the interface unit being directly connected to the digital telephone, the interface unit being directly connected to the computer unit.

24. A private branch exchange system, the system comprising:
- a switch including a call processor and a digital line interface, the switch being in communication with a network;
- an interface module being connected directly to said switch, said switch separating said interface module from the network;
- at least one computer being connected directly to said interface module, said at least one computer comprising:
  - an input/output processor being connected to said interface module to process signals transmitted from said at least one computer unit and received to said at least one computer unit;
  - an event processor receiving and controlling a first message and a second message received from said interface module through said input/output processor, said event processor receiving and controlling additional messages;
  - a command transmitter transmitting a command received from said input/output processor and additional commands;
  - an application program operator executing an application routine, the application routine enabling said computer unit to record a time and date the first and second messages are received, the additional messages and the additional commands being generated by the application routine; and
  - a user interface interfacing a user with said at least one computer unit;
- at least one digital telephone being connected directly to said interface module, said interface module separating said switch from said at least one computer, said interface module separating said switch from said at least one digital telephone;
- said interface module transmitting the first message generated from said switch to said at least one computer, said interface module transmitting the second message received from said at least one digital telephone to said switch and to said at least one computer, the first message corresponding to a computer-directed message, the second message corresponding to a call origination event.

25. The system of claim 24, the network corresponding to a public switched telephone network.

26. The system of claim 25, said interface module corresponding to a computer telephony interface module being connected to said at least one computer through an RS232 cable.

* * * * *